(12) United States Patent
Ziauddin et al.

(10) Patent No.: US 6,581,055 B1
(45) Date of Patent: Jun. 17, 2003

(54) QUERY OPTIMIZATION WITH SWITCH PREDICATES

(75) Inventors: Mohamed Ziauddin, Fremont, CA (US); Ahmed Alomari, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 271 days.

(21) Appl. No.: 09/658,349

(22) Filed: Sep. 11, 2000

(51) Int. Cl.[7] ................................................ G06F 17/30
(52) U.S. Cl. .................................................. 707/4; 707/3
(58) Field of Search ............................... 707/9, 2, 3, 4, 707/5, 104.1; 709/203

(56) References Cited

U.S. PATENT DOCUMENTS

| | | | | |
|---|---|---|---|---|
| 5,301,317 A | * | 4/1994 | Lohman et al. ................. | 707/1 |
| 5,873,083 A | * | 2/1999 | Jones et al. ..................... | 707/4 |
| 6,085,223 A | * | 7/2000 | Carino, Jr. et al. ......... | 709/203 |
| 6,408,294 B1 | * | 6/2002 | Getchius et al. ............... | 707/5 |

* cited by examiner

*Primary Examiner*—Diane D. Mizrahi
(74) *Attorney, Agent, or Firm*—Park, Vaughan & Fleming LLP

(57) ABSTRACT

A method is provided for optimizing data queries using switch predicates to determine which query execution plan or sub-plan (generated by a query optimizer) is executed. The method may be implemented for a query that has multiple possible forms of execution or outcomes depending on a run-time condition or element (e.g., the value associated with a variable). The query may be expanded, and the different possibilities may be addressed in different sub-queries of the expanded query (e.g., with the sub-queries being joined through a UNION operation). Switch predicates are added to one or more sub-queries to determine which one(s) will execute, based on the run-time condition. A separate query execution sub-plan may be generated for each sub-query and the sub-plans may be combined to form a master or overall plan that is executed at run-time. For example, a NULLIF predicate returns one set of data (e.g., a single row of a database table) if an associated variable has a non-null value and another set of data (e.g., all rows having a value within a particular column) if the variable has a null value. Switch predicates comprising Boolean operations to test whether the variable has a null or non-null value may be applied to sub-queries corresponding to the different run-time possibilities. Optimization sub-plans may be generated and only a sub-plan associated with a switch predicate that evaluates to true will execute. Because the NULLIF predicate has been reduced to its different forms of operation, each possibility can be optimized to form a very efficient execution sub-plan.

24 Claims, 2 Drawing Sheets

QUERY OPTIMIZATION WITH SWITCH PREDICATES

BACKGROUND

This invention relates to the field of relational databases. More particularly, a system and methods are provided for optimizing a database query through the use of a switch predicate to control performance of a query execution plan.

In a database management system, users submit queries to retrieve data from a database. Queries often contain predicates that help identify the desired data. A predicate may specify a certain literal or constant value, in which case one or more data items matching the value are retrieved. Predicates can be much more complex, however, and include expressions designed to retrieve or identify data that differs according to the run-time environment in which the query is invoked by a user. Thus, a variable may be associated with or included in a predicate and, as a result the data retrieved by the query or identified by the predicate may differ widely depending on the value associated with the variable when the query is invoked.

As a more complex example, a query may include or invoke the NULLIF function. The NULLIF function returns a specific value if a variable associated with the function is NULL, and returns the value of the variable itself if it is not NULL. The value returned by the function may then be used within a query (e.g., to retrieve from a database table all rows having the value returned by the function in a particular column).

Database management systems often attempt to optimize queries in order to execute them and retrieve the desired data as efficiently or quickly as possible. However, if the data to be returned by the query can vary widely depending on the value assigned to a host variable or some other condition of the run-time environment in which the query is invoked, it may be difficult to effectively optimize the query. In particular, a query employing a predicate or function having multiple run-time possibilities (e.g., the NULLIF function) may return a single piece of data or a first set of data if a variable or other run-time element (e.g., a function dependent upon a value specified at run-time) has a first value and return a different set of data if the variable or element has a second value.

Such a query is difficult to optimize because the data to be returned or selected by the query depends on the variable, which does not have a fixed value. In this case an optimizer may assume that the query represents a particular percentage of the available data (e.g., within a specified table) and optimize the query for that percentage. However, the assumption of a fixed percentage will often be incorrect; the amount of data to be returned depends on the run-time value of the variable. Also, even if there is an index that could help speed performance of the query it may not be used because, although in one invocation the query may ask for a specific piece of data (for which the index would be useful), in another invocation it may ask for all or a large amount of data (in which case use of the index would hinder performance). Thus, existing optimization techniques cannot generate efficient plans to handle all possible forms that the query may take under different run-time conditions.

Therefore, what is needed is a method of optimizing database queries where the data to be retrieved or the manner in which data is to be selected for retrieval in response to a query may depend on a condition of the run-time environment (e.g., the value of a variable) at the time of the query invocation. What is also needed is a method of optimizing database queries without requiring alteration of the programming code of the executing database application.

SUMMARY

In one embodiment of the invention a method is provided for optimizing a plan for executing a data query (e.g., a query expressed in SQL (Structured Query Language) for retrieving or accessing data in a database) that may operate or function in different manners depending upon the run-time environment in which it is invoked. Switch predicates are added to the query, or an expanded form of the query, in order to remove the uncertainty as to which of the possible forms or outcomes the query may exhibit. In this embodiment a switch predicate comprises logic that operates like a switch to enable or disable a sub-query or portion of the query addressed to a particular form or outcome.

For example, where a query is submitted that contains a variable and the execution of the query depends upon the value of the variable at run-time (e.g., null or non-null, which range of values the variable falls in), the query may be expanded to include sub-queries directed to each possibility. Switch predicates may then be added to one or more of the sub-queries to allow or prevent the execution of the sub-query depending on the value of the variable. A switch predicate in this example may comprise a test of the variable against a specified value or range of values and a Boolean connection (e.g., with the "AND" operator) to the sub-query, so that the sub-query can only execute if the variable satisfies the test or does not satisfy the test, depending on the logic.

Thus, in one embodiment of the invention a query that has multiple, possibly diverging, outcomes or forms of execution may be disassembled or expanded into multiple sub-queries and augmented with switch predicates to control their operation. However, a sub-query that is always to be executed (e.g., regardless of the run-time value of a variable or other conditions) may not receive a switch predicate. From the expanded query and sub-queries one or more query execution plans and/or sub-plans may then be generated (e.g., one sub-plan for each sub-query). Sub-plans may be combined into one master plan that is executed when the query is invoked.

In this embodiment the execution of a query having multiple conditional outcomes is thus simplified by accounting for some or all of the conditions. As a result, an optimizer can generate an effective execution plan because each sub-plan of the plan can be devoted to one outcome and only a sub-plan that meets the run-time condition(s) need be executed.

DETAILED DESCRIPTION

Figure 1:
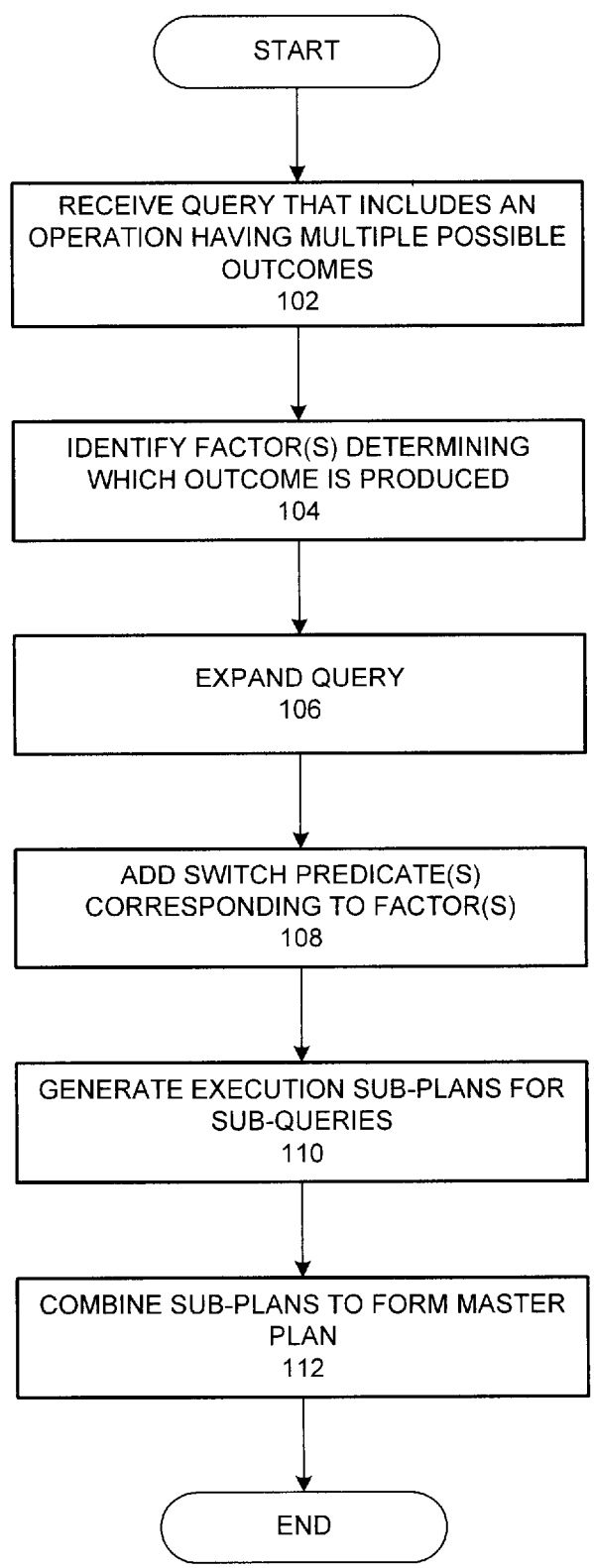
FIG. 1 is a flowchart illustrating one method of generating a query execution plan using switch predicates in accordance with an embodiment of the invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a system and method are provided for optimizing a query for execution, wherein the query may be executed in any of multiple forms depending on the run-time environment in which the query is invoked. More particularly, the data to be returned by the query may vary according to one or more factors or conditions (e.g., host variables) of the run-time environment. Illustratively, a database management system (DBMS) receives such a query for optimization and may expand or revise it to address the different forms (e.g., by constructing a sub-query for each one). In this embodiment, switch predicates are added to one or more of the forms or sub-queries to enable or disable them depending on the associated run-time condition. Query execution sub-plans may then be generated for each form and an overall execution plan assembled to combine the sub-plans. Illustratively, the switch predicates are configured so as to cause different portions, or branches, of the execution plan to be mutually exclusive. As a result, only that portion, or those portions, that meet the run-time condition(s) is/are executed.

The optimization of a data query typically involves parsing the query to understand its structure and form, and then determining an effective (and, preferably, optimal) manner in which to retrieve or access the requested data. An execution plan may specify how to access the data, how to format it, and any other operations to be performed. Where, for example, the data is stored in a relational database such as Oracle® Server by Oracle Corporation, the optimizer determines how to retrieve the data from database tables (e.g., whether to use an index, which index to use). If data is accessed from multiple tables, a JOIN or other operation may be performed to combine the data before providing the results to the user. Other operations (e.g., to sort or rank the data) may also be performed before presenting the results.

One skilled in the art will appreciate that current methods of optimizing data queries are often ineffective when the data (or the amount of data) to be retrieved or identified depends upon the run-time value of a variable within the query or some other run-time condition. Query execution plans are often generated in advance of a user's actual invocation of the query; when the query is finally invoked, the optimizer may just retrieve the plan and execute it. This is particularly true with shared or re-usable execution plans. An execution plan or set of sub-plans generated in accordance with an embodiment of the invention may be re-usable.

With existing query optimization techniques, because a plan is generated at a time when the value of a variable or state of some other run-time condition was unknown, the plan may be ill-suited for the value assigned to the variable at run-time. Where, for example, a query may retrieve either a small number of data items (e.g., one or a few rows of a database) or a relatively large number, depending on the value of a host variable (e.g., in a NULLIF function), current optimization techniques often assume one or the other will occur or attempt to split the difference. In either case, the result can be inefficient. The optimization may force a table scan when an index could have retrieved the few desired values much more efficiently or, conversely, it may use an index to inefficiently retrieve numerous items via random access to a database when it could have accessed them sequentially through a table scan. And, if an optimizer attempts to split the difference between the two divergent outcomes, it will always generate sub-optimal plans.

Thus, one or more embodiments of the invention described below involve the creation of a query execution plan using switch predicates to control which portion of the plan is performed at run-time, depending on the status or value of a run-time condition or element (e.g., a host variable) cited in a query or otherwise associated with the query. Illustratively, a switch predicate comprises a Boolean test that either enables or disables an associated portion of the plan. Therefore, when an optimizer receives a query, generates or retrieves a plan and determines the status or value of the run-time condition or element, one or more portions of the plan are disabled and the query is executed in accordance with the remaining portion(s).

The methods of the invention described herein are applicable to any type or form of query or expression that can be optimized with greater accuracy or precision by considering its run-time environment (e.g., the value of a variable, the number of ranked or sorted data items to retrieve). Thus, although embodiments are described for a few illustrative expressions, other embodiments of the invention may be derived for different expressions without exceeding the scope of the invention. In particular, embodiments of the invention are described herein as they may be applied to the NULLIF, CASE and RANK functions of the standard ANSI form of SQL (Structured Query Language). From these descriptions embodiments may be derived for other functions, predicates or expressions now known or hereafter developed.

One embodiment of the invention is now described as it may be implemented for the NULLIF function, which corresponds to and can be easily implemented with the NVL function of the Oracles Server relational database management system. A typical use of the NULLIF function may be in a query similar to the following:

Select * from Customer_Table     (1)

Where Customer_ID=NULLIF(:var, Customer_ID);

In this example, the value or value(s) returned by the NULLIF function depend upon the value of the host variable :var. Specifically, if :var has a non-null value the function returns the value of :var, the predicate reduces to Customer_ID=:var and the row(s) in the Customer_Table table having Customer_ID values equal to the value of the variable are retrieved. Otherwise, if :var has a null value then the function returns Customer_ID and the predicate becomes Customer_ID=Customer_ID which causes the query to retrieve rows from Customer_Table for all known values in the Customer_ID column or field.

A query such as query (1) above is difficult to optimize with existing techniques because the value of :var is dynamic and the amount of data to be retrieved can vary greatly depending on the value of the variable at the time the query is invoked. An existing optimization technique for query (1) would likely assume that the predicate will return a certain percentage of rows in the Customer_Table table because of the equal (i.e., "=") operator in the predicate. The optimizer may determine the number of unique Customer_ID values (i.e., the number of distinct values) and assume that the predicate will return a percentage of rows corresponding to one divided by the number of unique Customer_ID values. This may be somewhat accurate if :var has a non-null value, but will be far off-base if :var is null.

Also, the optimizer cannot, or should not, use an index on the Customer_ID column even if one is available, because if :var is null and all known Customer_ID values are being retrieved, use of the index will make the retrieval very inefficient. Using an index in this situation would cause the table rows to be retrieved one at a time, via random access to a data storage device based on the row pointers associated with the index values. A table scan would be more efficient because it would allow the rows to be retrieved via sequential access.

Thus, in one embodiment of the invention query (1) is optimized by allowing for both meaningful conditions of :var—null and non-null. Illustratively, for each condition an execution sub-plan is constructed that specifies how to execute the query for that condition. The sub-plans are generated and configured to correspond with the possible forms of operation of the NULLIF function. For example, query (1) included the predicate NULLIF(:var, Customer_ID), which operates differently depending on the value or condition of the :var variable—null or non-null. These different possibilities may be separately represented as Customer_ID=:var and Customer_ID=Customer_ID.

In this embodiment of the invention, switch predicates may be added to enable or disable each possible outcome, based on the value of :var at the time the query is invoked, to yield the following:

Customer_ID=:var AND :var is NOT NULL and Customer_ID=Customer_ID AND :var is NULL The Boolean conditions added to each predicate only allow a predicate to execute if the operative run-time condition (i.e., the variable :var) has the value or state that would yield that form of the predicate in query (1). Using these switch predicates, query (1) can be expanded and composed of sub-queries representing the different possible outcomes of the NULLIF function, with a UNION ALL operator to tie the sub-queries together, to produce Select * from Customer_Table (2)

Where Customer_ID=:var AND :var is NOT NULL
UNION ALL
Select * from Customer_Table
Where Customer_ID=Customer_ID AND :var is NULL The UNION ALL operator adds or combines the results of the two different sub-queries.

As a result of the expansion of query (1) into query (2), the complex NULLIF predicate of query (1) is reduced to simple predicates for which the amount of data to be returned (e.g., the selectivity of the query) can be measured or estimated with greater accuracy. And, if an index is available for the Customer_ID field or column, it can be used to speed the data access if :var has a non-null value. Optimal execution sub-plans can thus be generated for the sub-queries of query (2) because of the relatively accurate estimation of their selectivity, and the sub-plans may be combined to form an overall, or master, execution plan, with only the appropriate sub-plan executing for a given run-time state (i.e., value of :var).

Although both portions or branches of a query joined by a UNION ALL operator are usually executed, the switch predicates implemented in this embodiment ensure that only the appropriate portion(s) of a query are executed. In particular, only one of the switch predicates :var is NOT NULL and :var is NULL can be true, thus controlling which branch of the expanded query (2) is executed.

Advantageously, the database application in which a user submits a query expanded in the manner described above need not be modified in order to implement this embodiment of the invention. More particularly, it is the manner in which an optimizer (e.g., within the database engine) generates a query execution plan that is modified. Instead of generating a plan based on one possible or estimated value of a variable within a query predicate, separate sub-plans are generated for each possibility and then combined to form a flexible, master plan that is equally well-suited for each possibility.

Although the expanded (i.e., query (2)) form of query (1) above was generated using only two switch predicates, in other embodiments of the invention any number of switch predicates may be required and may be configured for virtually any run-time condition. For example, a query may have more than two possible forms of execution, may include multiple host variables or may depend on values other than null and non-null.

In a query having multiple NULLIF predicates, the number of sub-queries in an expanded query (and the number of execution sub-plans) increases exponentially (i.e., $2^n$, where n is the number of NULLIF predicates). In such a complex query it may be desirable to expand the query for only a subset of the predicates. One possibility is to only expand predicates that reference database columns or attributes for which one or more indexes are available or for which some set of historical or statistical information is available to estimate or facilitate the retrieval of appropriate and responsive data.

Another possibility is to expand predicates that refer to columns for which greater selectivity is possible. In particular, when the variable in a NULLIF predicate is not null, only the table rows having the specified variable value are retrieved. The number of rows to be retrieved in relation to the total number of rows can be termed the selectivity. If a column referenced by a particular predicate has good selectivity (i.e., identifying a particular columnar value will allow a very low number of rows to be retrieved in proportion to the total number of rows), that predicate may be a good candidate for expansion, particularly if the column is indexed.

It will be understood that using one execution plan that is compatible with different run-time conditions may be more efficient than using multiple execution plans (e.g., one for each possible outcome). This scheme increases the re-usability of a plan and decreases the consumption of system resources (e.g., memory).

The optimization of a query expanded in the manner described herein may be dynamic or recursive. In other words, for a given query a first set of execution sub-plans may be produced (e.g., through a first expansion of the query with a first set of switch predicates). If this set of sub-plans is less efficient or more expensive than a plan or plans generated from the original, non-expanded query, the first expansion may be rejected and a new one developed. In this manner the most efficient or effective execution plan can be determined.

An embodiment of the invention may also be implemented for the CASE function of the ANSI form of SQL, which corresponds to the DECODE function for Oracle® Server. The CASE function is, however, a general form of the NULLIF function and may thus be expanded in a similar manner to that described above.

An illustrative query invoking the CASE function is as follows:

$$\text{Select * from Customer\_Table} \tag{3}$$

Where Customer_ID=CASE(:var, NULL, Customer_ID, 0, :user_id, :var)

The CASE function or predicate of query (3) serves to return Customer_ID if :var is null, the value of the :user_id variable if :var is equal to 0, and the value of :var otherwise. According to one embodiment of the invention query (3) may be expanded as follows:

$$\text{Select * from Customer\_Table} \tag{4}$$

Where Customer_ID=Customer_ID AND :var is NULL UNION ALL
Select * from Customer_Table
Where Customer_ID=:user_id AND :var=0 UNION ALL
Select * from Customer_Table
Where Customer_ID=:var AND :var<>0

As can be seen from the preceding examples, expanding complex predicates such as NULLIF and CASE with switch predicates allows a query optimizer to generate better, more efficient, query execution plans. In particular, a query execution plan may be generated from multiple sub-plans, each of which may be directed to a possible value or condition of a query variable. Also, the use of switch predicates allows the optimizer to use column statistics with the expanded form of a function, estimate with greater accuracy the amount of data to be retrieved and, as a result, access that data more efficiently. For example, an index may be used if one exists for a column associated with the function, thereby decreasing the cost of executing the query.

Further, executing a query more efficiently under an embodiment of the invention allows follow-on benefits as well. By enabling more accurate estimates of the selectivity of a query, the cost or complexity of any subsequent operations on the retrieved data (e.g., joins, sorts) can also be estimated more accurately.

Figure 2:
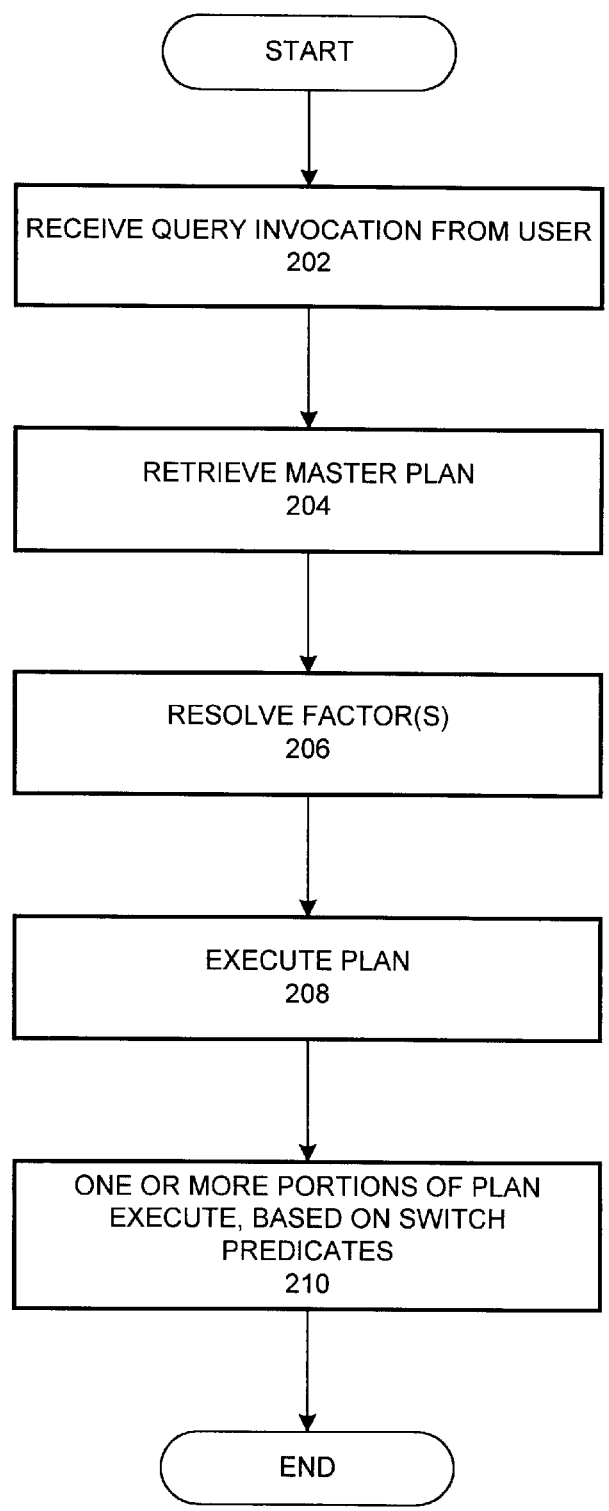
FIG. 2 is a flowchart illustrating one method of implementing a query execution plan in accordance with an embodiment of the invention.

FIGS. 1–2 illustrate one method of implementing an embodiment of the invention to optimize the execution of a query constructed for a database management system such as Oracle® Server. FIG. 1 presents a method by which an optimizer may generate an execution plan for a query, while FIG. 2 demonstrates a method by which a query executor may apply the execution plan when a user invokes the query. Illustratively, in this embodiment of the invention the query execution plan is generated prior to a user's invocation of the query. Another embodiment, however, may be derived from the following discussion to provide for the generation of an execution plan when a query is invoked.

In state 102 a query is received from a user, application, database administrator or other source. Operation of the query may take any of multiple forms, or perform any of a plurality of actions, depending on the run-time environment in which the query is invoked. As described above, for example, an SQL (Structured Query Language) query may include an expression employing the NULLIF or CASE functions, wherein the data returned by such functions depend upon the value of an associated variable.

In state 104 one or more factors are identified that determine which of the plurality of operative forms or actions will result when the query is invoked. For the NULLIF and CASE functions, structure or syntax of the function is understood and the associated variable is identified. Other expressions may depend on other conditions or statuses ascertainable at the time the query is invoked. In general, an administrator, analyst or programmer may determine how to apply an embodiment of the invention for a particular query or expression by determining how it works and the factor(s) on which its outcome depends. The optimizer can then be designed or modified accordingly.

In state 106 the query is expanded in order to transform the multiple conditional forms of execution into a plurality of sub-queries. Illustratively, each sub-query addresses one possible outcome, thus reducing the relatively complex expression having an outcome that can't be known until run-time with simpler expressions having outcomes that can be estimated much more accurately. Alternatively, multiple outcomes may be handled in a single sub-query.

In state 108, one or more of the sub-queries are augmented with switch predicates to control which of the sub-queries are executed under different run-time conditions. More particularly, the switch predicates address different possible states for the outcome-determinative factor(s) identified in state 104. Thus, as seen above, a switch predicate may comprise a Boolean test to determine whether a run-time condition or element (e.g., the value of a variable) matches a specified value or falls within a specified range of values. A switch predicate may take other forms as well, but in general is constructed to enable or disable its sub-query depending on the run-time state of an outcome-determinative factor. The various sub-queries of the expanded query may be combined with one or more appropriate connectors, such as UNION statements.

As explained above, it is possible that a portion of a query (e.g., a sub-query) may be executed every time the query is invoked (e.g., regardless of the run-time environment or value of a query variable), in which case no switch predicate need be associated with the sub-query. Alternatively, the switch predicate for the sub-query may be constructed to allow the sub-query to always execute.

In state 110 an optimizer generates execution sub-plans for each sub-query of the expanded query. It will be understood that this embodiment of the invention is designed to use switch predicates to allow an optimizer to generate an optimal execution plan more easily. Thus, in this embodiment the method in which the optimizer incorporates the switch predicates into a query execution plan or sub-plan may be similar to existing methods, or methods hereafter developed, or may be tailored to the novel use of the switch predicates.

In state 112 the optimizer combines the sub-plans into one overall or master execution plan to be implemented when the query is actually invoked by a user. States 110 and 112 may be combined in one alternative embodiment of the invention. In yet another alternative embodiment of the invention state 112 may be omitted, in which case each sub-plan is maintained as a separate execution plan and the optimizer determines which plan to execute when the query is invoked. After state 112 the illustrated method ends.

One skilled in the art will recognize that FIG. 1 depicts just one method of generating a query execution plan for a query that yields different outcomes for different run-time conditions. Other methods may be derived from the preceding discussion without exceeding the scope of the invention.

FIG. 2 demonstrates one method of performing or implementing a query execution plan (or sub-plan) when a query is invoked, in accordance with the run-time environment and conditions thereof.

In state 202 a user invokes the query for which a query execution plan was generated (e.g., according to the method of FIG. 1). Illustratively, the plan was generated prior to the query invocation. The plan may, for example, be a shared or re-usable execution plan that is performed for each invocation of the query.

In state 204 a query executor or other entity retrieves the query execution plan and, in state 206 resolves the factor or factors that determine the execution or form of the query. For example, where the action taken or the data values to be extracted from a database depend upon the value of a variable, that value is ascertained. As described in conjunction with FIG. 1, the query execution plan may include sub-plans directed to different statuses of the factor(s) or may be tailored to a particular status.

In state 208 the executor invokes or executes the plan and, in state 210, one or more portions (or sub-plans) of the plan are executed. Because of the switch predicates used in generating the plan, the portion or portions that are executed are appropriate for the status of the factor(s) that determine the form or action of the query. After state 210 the illustrated method ends.

Embodiments of the invention are not limited to predicates such as NULLIF and CASE. As described above, the optimization of virtually any query having multiple forms of operation or execution that depend on a run-time condition or factor may also benefit from the use of switch predicates.

Thus, an embodiment of the invention may be implemented for queries attempting to retrieve a specified number of data items ranked by some criteria. For example, the following query is intended to identify the salespersons having the top sales figures in a Sales table:

Select * from (5)

(Select sales_person, sales_amount,
RANK(order by sales amount desc) Top_Sales from Sales)
where Top_Sales<=:rnk;

Query (5) is designed to return the top sales persons, wherein the number of ranked sales persons to be returned is indicated by the value associated with the :rnk variable at the time query (5) is invoked.

The optimal or preferred method of retrieving the desired information may depend on the value of :rnk. In particular, if the value of :rnk is relatively low, then it may be more efficient to use an index to retrieve the information. Contrarily, if the value of :rnk is relatively high then it may be better to perform a table scan, followed by sorting, rather than use an index.

A delimiting value (for :rnk) that separates the values for which an indexed search is better from the values for which a table scan is preferable may be determinable from auxiliary information. In other words, there may be some discernable cross-over value for :rnk, above which table scans should be performed and below which indexed searches should be performed. For example, a histogram may provide information concerning the distribution of sales_amount figures.

If such auxiliary information is available, then a switch predicate may be employed to ensure the proper search method is employed. Illustratively, query (5) may be expanded as follows:

Select * from (6)

(Select sales_person, sales_amount,
RANK(order by sales_amount desc) Top_Sales
where :rnk<cross_over_value
from Sales
UNION ALL
Select sales_person, sales_amount,
RANK(order by sales_amount desc) Top_Sales
where :rnk>=cross_over_value from Sales)
where Top_Sales<=:rnk;

In query (6), the switch predicates :rnk<cross_over_value and :rnk>=cross_over_value control how the Sales table is searched. In the first sub-query of query (6), the optimizer picks an index to access the data, while for the second sub-query it will do a table scan (and a corresponding sort operation). When the query is invoked and the resulting execution plan is executed, only one of the two sub-queries will actually execute, based on the value of the :rnk variable.

In one alternative embodiment of the invention the run-time condition or factor that determines how a query operates, and which query execution plan or sub-plan is executed, may depend upon the amount of data being manipulated. For example, in a JOIN operation involving multiple database tables, the manner in which the JOIN is performed may depend on the table sizes. In particular, if all but one of the table sizes are known, the form of the JOIN operation may depend on the size of the last table. In this example, different execution plans or sub-plans may be generated for different possible sizes or ranges of size, perhaps based on statistical data indicating past or present table sizes. Illustratively, three different sub-plans may be generated for three different size ranges (e.g., small, medium and large). Based on the size of the table, as determined at the time the query is invoked, the appropriate execution plan or sub-plan is executed.

As another example, a SELECT statement or other operation may access a table having an unknown size, which may be a temporary or private table. Such a table may have been created as an intermediate step in the execution of a query.

The manner in which such a temporary table is accessed may, in accordance with this alternative embodiment, depend upon how large the table is at the time it is accessed. Thus, the use of a switch predicate testing for a threshold, estimated or expected table size may allow for more efficient query execution.

In another alternative embodiment of the invention a switch predicate need not be added to each sub-query of an expanded query. In particular, it may be that one sub-query should always be executed (e.g., to retrieve a first set of data from a table). The operation of other sub-queries in the same query may then depend on the first set of data. Thus, based on the operation of the first sub-query, a switch predicate in another sub-query may determine whether the other sub-query also executes.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of optimizing a database query having multiple forms of execution, wherein the form with which the query is to execute is unknown until the query is invoked, the method comprising:
   constructing a plan for optimizing the query, said plan including:
      a plurality of sub-plans, wherein different sub-plans are configured to execute different forms of the query; and
      one or more switches configured to control execution of one or more of said plurality of sub-plans;
   receiving an invocation of the query; and
   executing said plan to optimize the query.

2. The method of claim 1, wherein the form with which the query is to execute depends upon a dynamic condition, the method further comprising determining a status of said condition at the time the query is invoked.

3. The method of claim 2, wherein said receiving an invocation of the query comprises receiving said status of said dynamic condition.

4. The method of claim 2, wherein said dynamic condition is a variable and determining a status of said variable comprises determining a value associated with said variable.

5. The method of claim 1, wherein said constructing comprises:
   expanding the query to include multiple sub-queries corresponding to said different forms of execution of the query.

6. The method of claim 5, wherein said constructing further comprises constructing a plan for said expanded query.

7. A method of optimizing a database query comprising a predicate that includes a variable, the method comprising:
   receiving a database query, said query comprising a predicate including a variable, wherein evaluation of said predicate depends on a value assigned to said variable when said query is invoked;
   constructing a query execution plan to optimize execution of said query, wherein said plan comprises:
      a plurality of sub-plans corresponding to respective values of said variable; and
      a switch predicate that enables or disables one of said sub-plans depending on said value of said variable when said query is invoked;
   receiving an invocation of said query;
   determining a value of said variable; and
   executing said query execution plan.

8. The method of claim 7, further comprising expanding said query, said expanded query including:
   a plurality of sub-queries, wherein different sub-queries implement said predicate for different values of said variable; and
   said switch predicate.

9. The method of claim 7, wherein said predicate is the NULLIF predicate.

10. The method of claim 7, wherein said predicate is the CASE predicate.

11. The method of claim 7, wherein said predicate is the RANK function.

12. A method of responding to a query, comprising:
   receiving a query invocation, wherein the manner in which said query is to execute depends upon a dynamic condition;
   examining said dynamic condition;
   retrieving a plan for executing said query, said plan comprising multiple sub-plans configured for different statuses of said dynamic condition; and
   executing said plan;
   wherein a first switch predicate within said plan determines whether a first sub-plan of said multiple sub-plans executes.

13. The method of claim 12, wherein a second switch predicate determines whether a second of said multiple sub-plans executes.

14. The method of claim 12, wherein said dynamic condition is a value of a variable.

15. The method of claim 12, wherein said dynamic condition is the size of a table.

16. A computer readable storage medium storing instructions that, when executed by a computer, cause the computer to perform a method of optimizing a database query, the method comprising:
   constructing a plan for optimizing the query, said plan including:
      a plurality of sub-plans, wherein different sub-plans are configured to execute different forms of the query; and
      one or more switches configured to control execution of one or more of said plurality of sub-plans;
   receiving an invocation of the query; and
   executing said plan to optimize the query.

17. An apparatus for executing a query on a database, comprising:
   a query module configured to receive a query, wherein said query has multiple possible forms of execution and the form with which said query will execute is unknown until said query is invoked;
   a query execution plan for executing said query upon said invocation, said plan comprising multiple sub-plans, wherein each said sub-plan is tailored to implement one of said multiple possible forms of execution; and
   an optimizer configured to generate said query execution plan;
   wherein one or more switch predicates are associated with said sub-plans to control which of said sub-plans execute when said query is invoked.

18. The apparatus of claim 17, wherein said switch predicates are configured to enable or disable said sub-plans by examining a run-time condition.

19. The apparatus of claim 18, wherein said run-time condition is a variable.

20. A database management system for retrieving data in response to the invocation of a query, wherein the data that is retrieved depends on the status of a dynamic condition at the time the query is invoked, the system comprising:
    an optimizer configured to optimize a query for efficient execution;
    a first query execution plan generated by said optimizer for a first query, the plan comprising:
        multiple sub-plans configured to retrieve different sets of data; and
        a switch predicate configured to control whether a first sub-plan of said multiple sub-plans executes, depending on the status of a dynamic condition; and
    an executor configured to execute said first query execution plan in response to an invocation of said first query.

21. The database management system of claim 20, wherein said dynamic condition is a variable.

22. The database management system of claim 21, wherein said status of said variable comprises a value associated with said variable.

23. A computer readable storage medium storing instructions that, when executed by a computer, cause the computer to perform a method of optimizing a database query comprising a predicate that includes a variable, the method comprising:
    receiving a database query, said query comprising a predicate including a variable, wherein evaluation of said predicate depends on a value assigned to said variable when said query is invoked;
    constructing a query execution plan to optimize execution of said query, wherein said plan comprises:
        a plurality of sub-plans corresponding to respective values of said variable; and
        a switch predicate that enables or disables one of said sub-plans depending on said value of said variable when said query is invoked;
    receiving an invocation of said query;
    determining a value of said variable; and
    executing said query execution plan.

24. A computer readable storage medium storing instructions that, when executed by a computer, cause the computer to perform a method of responding to a query, the method comprising:
    receiving a query invocation, wherein the manner in which said query is to execute depends upon a dynamic condition;
    examining said dynamic condition;
    retrieving a plan for executing said query, said plan comprising multiple sub-plans configured for different statuses of said dynamic condition; and
    executing said plan;
    wherein a first switch predicate within said plan determines whether a first sub-plan of said multiple sub-plans executes.

* * * * *